US012763670B2

(12) United States Patent
Panchireddi et al.

(10) Patent No.: US 12,763,670 B2
(45) Date of Patent: Oct. 13, 2026

(54) COMMUNICATING FAULTS BY A POWER STAGE OF A MULTI-PHASE SWITCHING CONVERTER

(71) Applicant: Shaoxing Yuanfang Semiconductor Co., Ltd., Shaoxing (CN)

(72) Inventors: Venkata Krishna Mohan Panchireddi, Srikakulam (IN); Michael Figueiredo, Amora (PT); Arnold J D'Souza, Bangalore (IN); Shyam Somayajula, Bangalore (IN)

(73) Assignee: Ningbo Aura Semiconductor Co., Ltd, Ningbo (CN)

( * ) Notice: Subject to any disclaimer, the term of this patent is extended or adjusted under 35 U.S.C. 154(b) by 149 days.

(21) Appl. No.: 18/957,945

(22) Filed: Nov. 25, 2024

(65) Prior Publication Data

US 2026/0025064 A1 Jan. 22, 2026

(30) Foreign Application Priority Data

Jul. 17, 2024 (IN) ............................ 202441054695

(51) Int. Cl.
*H02M 1/32* (2007.01)
*H02M 1/00* (2007.01)
(Continued)

(52) U.S. Cl.
CPC ......... *H02M 1/327* (2021.05); *H02M 1/0009* (2021.05); *H02M 1/081* (2013.01); *H02M 1/084* (2013.01)

(58) Field of Classification Search
CPC .... H02M 1/327; H02M 1/0009; H02M 1/081; H02M 1/084; H02M 1/32; H02M 3/1584
(Continued)

(56) References Cited

U.S. PATENT DOCUMENTS 5,497,105 A 3/1996 Oh et al.
6,608,519 B1 8/2003 Ajit
(Continued)

FOREIGN PATENT DOCUMENTS

JP 2014054031 A 3/2014

OTHER PUBLICATIONS

Nguyen Van Toan, Exploring the Impact of Multi-Frequency Clocking and GALS Design on Power Supply Noises, https://www.researchgate.net/publication/318407949_Exploring_the_impact_of_multi-frequency_clocking_and_GALS_design_on_power_supply_noises, Jun. 2017, 03 pages, IEEE.
(Continued)

*Primary Examiner* — Sreeya Sreevatsa
(74) *Attorney, Agent, or Firm* — IPHORIZONS PLLC; Narendra Reddy Thappeta

(57) ABSTRACT

A power stage of a multi-phase switching converter detects faults reliably, and contains a high-side switch and a low-side switch connected in series between a first power terminal and a ground terminal. A gate driver generates drive signals to the two switches based on a control signal received from a phase controller. A fault logic block, powered at a second power terminal, generates (binary) deviation signals indicating whether or not a corresponding fault exists by examining states internal to the power stage. Ringing can occur at the ground and power terminals when the control signal switches between logic levels. The fault logic block generates fault signals by sensing the deviation signals according to a delayed version of the control signal, with the delay having a magnitude greater than a settling time of the ringing. By thus delaying the sensing of the deviation signals, any interference by the ringing is avoided.

20 Claims, 8 Drawing Sheets

(51) Int. Cl.
*H02M 1/08* (2006.01)
*H02M 1/084* (2006.01)

(58) Field of Classification Search
USPC .............................................................. 361/1
See application file for complete search history.

(56) References Cited

U.S. PATENT DOCUMENTS

| | | | | |
|---|---|---|---|---|
| 7,683,659 | B1 | 3/2010 | Zamek et al. | |
| 2004/0108875 | A1* | 6/2004 | Kaushik | H03K 17/166 327/112 |
| 2005/0225259 | A1* | 10/2005 | Green | H02M 3/1588 315/308 |
| 2014/0062439 | A1* | 3/2014 | Nishijima | H02M 3/156 327/312 |
| 2023/0179099 | A1* | 6/2023 | Archibald | H02M 3/158 |
| 2024/0125825 | A1* | 4/2024 | D'Souza | G01R 19/16571 |

OTHER PUBLICATIONS

Ashok Vittal, Clock Skew Optimization for Ground Bounce Control, 1996, 05 pages, IEEE.
Mustafa Badaroglu, Digital Ground Bounce Reduction by Supply Current Shaping and Clock Frequency Modulation, Jan. 2005, 12 pages, vol. 24, Issue-01, IEEE.
Simultaneous Switching Noise and Signal Integrity, Feb. 2018, 26 pages, Microsemi Power Matters.

* cited by examiner

COMMUNICATING FAULTS BY A POWER STAGE OF A MULTI-PHASE SWITCHING CONVERTER

PRIORITY CLAIM

The instant patent application is related to and claims priority from the co-pending India provisional patent application entitled, "Noise Gating", Serial No.: 202441054695, Filed: 17 Jul. 2024, which is incorporated in its entirety herewith to the extent not inconsistent with the description herein.

BACKGROUND

Technical Field

Embodiments of the present disclosure relate generally to multi-phase switching converters, and more specifically to communicating faults by a power stage of a multi-phase switching converter.

Related Art

A switching converter refers to a component which generates a regulated DC (direct current) voltage from an input power source by employing one or more switches, as is well known in the relevant arts. Switching converters are used in components such as regulated power supplies, which in turn are used in devices such as computers and mobile phones, as is also well known in the relevant arts.

A switching converter often contains a pair of power switches driving an inductor. Each power switch (switch) is typically implemented as a transistor (e.g., MOSFET) and the switches are connected in series between input supply voltage and a reference terminal (e.g., ground). The switch coupled closer to the input voltage (source of input power to the converter) is termed as the high-side switch, while the other one is termed as a low-side switch. The switches are operated by a control circuit which switches ON the transistors in successive non-overlapping time durations to cause the switch that is currently ON to drive the inductor in the corresponding duration.

A multi-phase switching converter contains multiple ones of such pairs of switches, along with associated circuitry for each pair. Each pair is typically operated in a corresponding phase of a sequence of phases, with the pairs together operating to generate the desired regulated voltage (supply rail) and capable of supporting higher load currents at greater efficiencies as well as providing other advantages, as is well known in the relevant arts. Each of such pairs, along with the associated circuitry, is referred to as a power stage of a supply rail provided by the multi-phase switching converter. A phase controller operates to control the specific times that each of the power stages of a supply rail is operative in generating the desired output voltage.

A power stage may be implemented to generate signals indicating faults in components or circuits inside the power stage, and communicating the fault signals to the phase controller. Faults refer to situations in which the values of operating parameters (such as current, temperature, voltage, etc.) are outside the corresponding ranges of specified ratings. Faults can occur due to reasons such as component aging, defective components, connection faults (such as open or short circuits), etc. Some examples of faults are—current through the inductor exceeding corresponding permissible limit, temperature of the power stage exceeding corresponding permissible limit, voltage at input power supply terminal being outside specified range, etc.

Faults can lead to improper operation of the corresponding power stage, damage and malfunction of various other components of the multi-phase switching converter or devices using the multi-phase switching converter. Corrective actions such as potentially temporarily shutting down the power stage, can be taken to manage the fault. It is therefore desirable to capture faults reliably and take appropriate action upon occurrence of such faults.

Aspects of the present disclosure are directed to communicating faults by a power stage of a multi-phase switching converter.

BRIEF DESCRIPTION OF THE VIEWS OF DRAWINGS

Example embodiments of the present disclosure will be described with reference to the accompanying drawings briefly described below.

In the drawings, like reference numbers generally indicate identical, functionally similar, and/or structurally similar elements. The drawing in which an element first appears is indicated by the leftmost digit(s) in the corresponding reference number.

DETAILED DESCRIPTION

1. Overview

Figure 1:
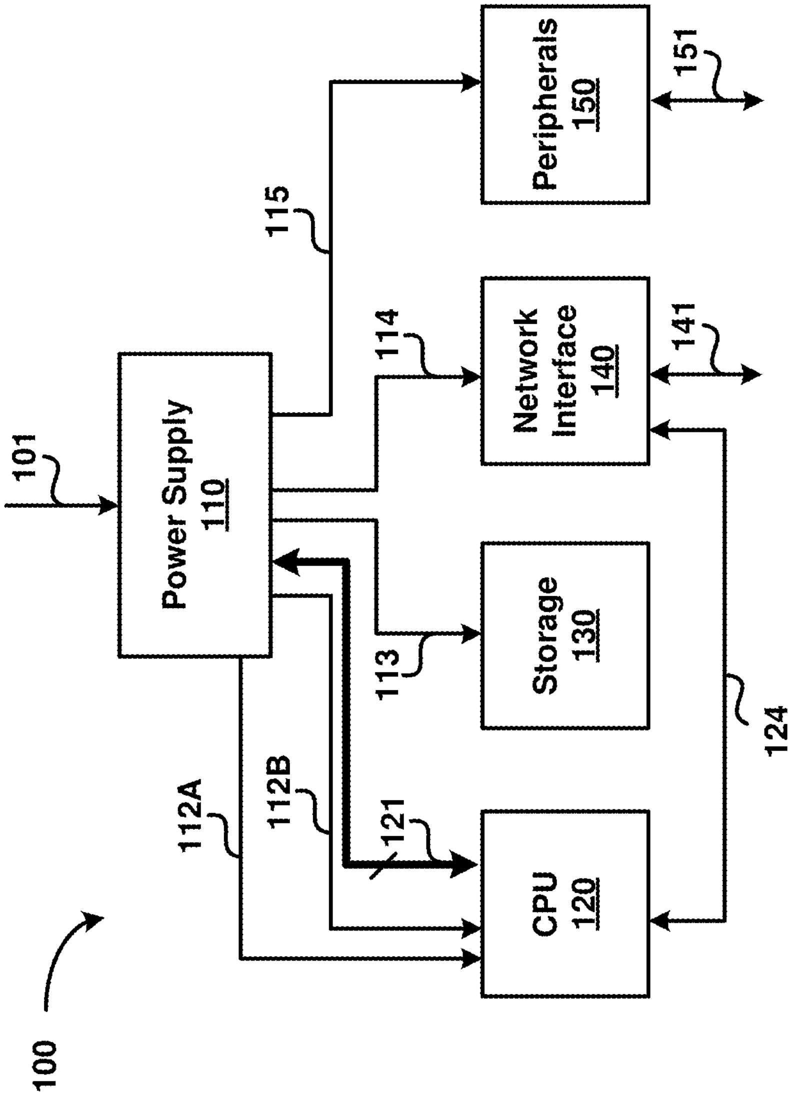
FIG. 1 is a block diagram of an example system in which several aspects of the present disclosure can be implemented.

Aspects of the present disclosure are directed to reliable detection of faults by a power stage of a multi-phase switching converter containing a high-side switch and a low-side switch connected in series at a switching node, with the high-side switch and the low-side switch being connected in series between a first power terminal provided with a first power source and a ground terminal providing a constant reference potential. An inductor is coupled between the switching node and an output node at which the power stage provides a regulated voltage. A second power terminal provided with a second power source provides power to the components inside the power stage.

A gate driver generates respective drive signals to the two switches based on a control signal received from a phase controller, wherein a first drive signal and a second drive signal are respectively asserted when the control signal is at a first logic level and a second logic level. It has been observed by the inventors that ringing can occur at the ground terminal when the control signal switches between the first logic level and the second logic level. Ringing may additionally occur at the power terminals.

A fault logic block generates deviation signals indicating corresponding deviations by examining states internal to the power stage, wherein each deviation signal is a binary logic signal indicating whether or not a corresponding fault exists. The fault logic block generates fault signals by sensing the deviation signals according to a delayed version of the control signal, wherein the delayed version is generated by delaying the control signal by a first delay greater than a settling time of the ringing. By thus delaying the sensing of the deviation signals, any interference by the ringing is avoided.

The control signal toggles between the first and second logic levels periodically in a first duration, and does not toggle in a second duration. In an embodiment, the fault logic block contains fault-sampling blocks with each fault-sampling block receiving a corresponding deviation signal and generating a respective fault signal. Each fault-sampling block of the plurality of fault-sampling blocks contains a flip-flip that receives the corresponding deviation signal on a data input and the delayed version on a clock input in the first duration, and receives the corresponding deviation signal on a set input in the second duration. A Q-output of the flip-flop is the fault signal.

Several aspects of the present disclosure are described below with reference to examples for illustration. However, one skilled in the relevant art will recognize that the disclosure can be practiced without one or more of the specific details or with other methods, components, materials and so forth. In other instances, well known structures, materials, or operations are not shown in detail to avoid obscuring the features of the disclosure. Furthermore, the features/aspects described can be practiced in various combinations, though only some of the combinations are described herein for conciseness.

2. Example System

FIG. 1 is a block diagram of an example system in which several aspects of the present disclosure can be implemented. System 100 is shown containing power supply 110, central processing unit (CPU) 120, storage 130, network interface 140 and peripherals 150. In an embodiment, system 100 corresponds to a computer (desktop, laptop, etc.), although system 100 can represent other types of systems in other embodiments. It is understood that system 100 can contain more or fewer blocks than those shown in FIG. 1.

CPU 120, in general, represents a processor or a system-on-chip (SoC), and is shown as receiving a pair of supply voltages (Va and Vb) on respective paths 112A and 112B from power supply 110. As an example, Va may be a lower voltage than Vb, and may be used to power a core portion of CPU which may include arithmetic logic unit (ALU), microprogram sequencer, registers, etc. Vb may be used to power the rest of CPU 120, such as for example, input/output (I/O) units, I/O buffers, on-chip peripherals etc. CPU 120 provides various signals (all deemed to be contained in path 121) specifying, among others, its power supply requirements to power supply 110. Examples of such signals can be those that specify the specific mode of operation (in terms of power consumption) such as PS1, PS2, PS3, etc., which refer to "Power Save States for Improved Efficiency".

Storage 130 represents a memory that may include both volatile and non-volatile memories. For example, in a personal computer, storage can include magnetic memory (hard disk) as well as solid state memory (RAM, Flash, etc.). Storage 130 is shown receiving a supply voltage on path 113 for powering various circuits and blocks within.

Network interface 140 operates to provide two-way communication between system 100 and a computer network, or in general the Internet. Network interface 140 implements the electronic circuitry required to communicate using a specific physical layer and data link layer standard such as Ethernet or Wi-Fi™. Network interface 140 may also contain a network protocol stack to allow communication with other computers on a same local area network (LAN) and large-scale network communications through routable protocols, such as Internet Protocol (IP). Network interface 140 receives a power supply on path 114 for powering internal circuits and blocks. Network interface 140 receives from/transmits to external systems and CPU 120 respectively on path 141 and path 124.

Peripherals 150 represents one or more peripheral circuits, such as, for example, speakers, microphones, user interface devices, etc. Peripherals 150 receives a power supply on path 115, and communicates with external devices on path 151.

Power supply 110 receives power from one or more sources (e.g., battery) on path 101, and operates to provide the desired power supply voltages on paths 112A, 112B, 113, 114 and 115. In an embodiment, power supply 110 is designed to contain one or more multi-phase DC-DC converters within to generate the power supply voltages. Power supply 110 responds to signals from CPU 120 received on path 121 to control the multi-phase converters to reduce/increase current output based on the specific signal (e.g., PS1, PS2 and PS3).

In the embodiment, power supply 110 is a voltage regulator module (VRM), sometimes also called processor power module (PPM), and contains one or more step-down switching (buck) converters to generate several lower voltages from a higher-voltage supply source. In other embodiments however, other types of DC-DC converters such as boost, buck-boost, hysteretic converters etc., can be implemented instead of a buck converter. With a VRM, multiple devices/ICs requiring different supply voltages can be mounted on the same platform, for example, a computer motherboard of a personal computer (PC). Accordingly, the description is continued with respect to a VRM as shown in FIG. 2.

3. Voltage Regulator Module (VRM)

Figure 2:
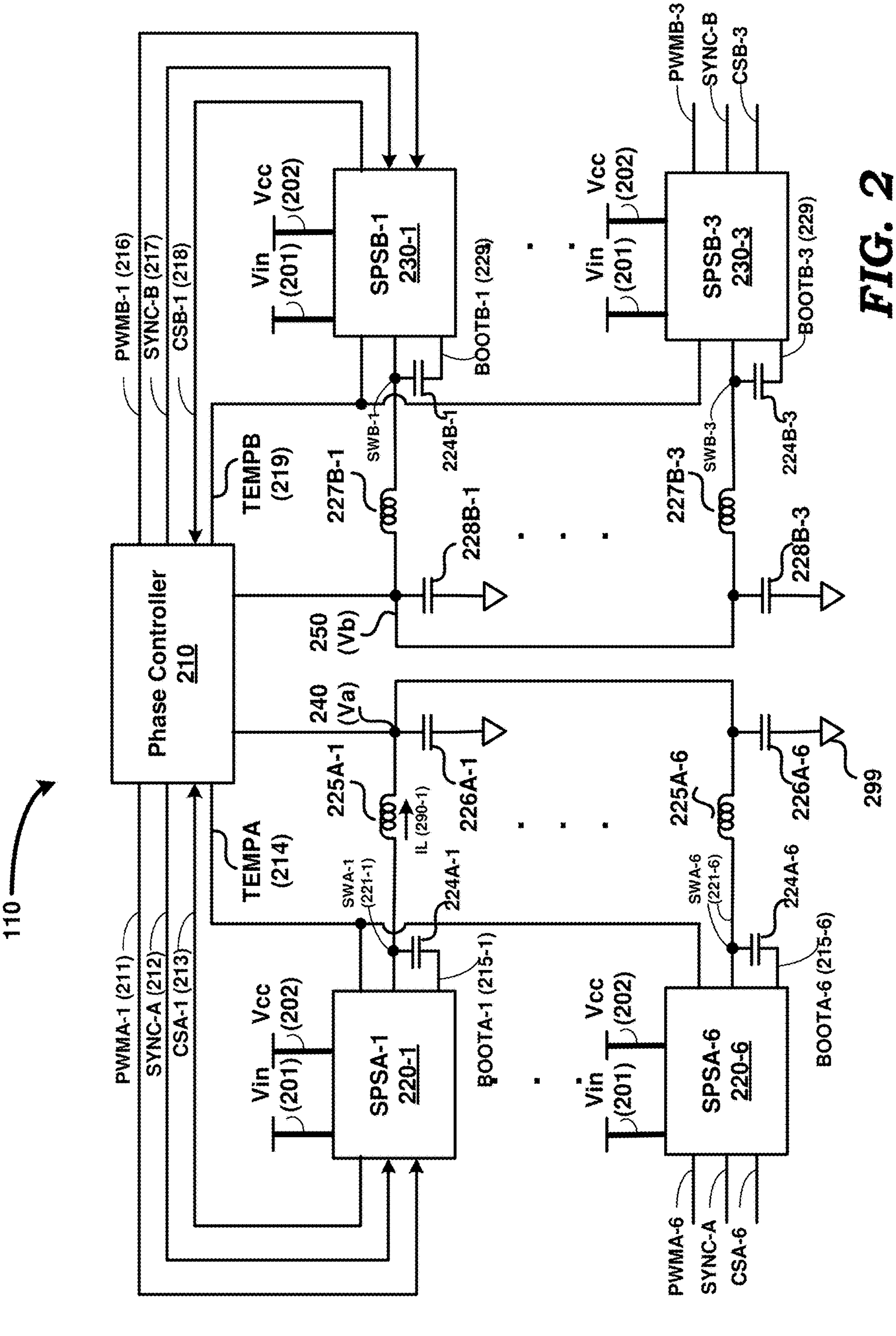
FIG. 2 is a block diagram illustrating the details of a voltage regulator module (VRM) in an embodiment of the present disclosure.

FIG. 2 is a block diagram illustrating the details of a VRM in an embodiment of the present disclosure. Power Supply 110 (of FIG. 1) is implemented as a Voltage Regulator Module implemented in the form of a multi-phase switching converter generating two regulated voltages Va (240) and Vb (250).

VRM 110 is shown containing phase controller 210, smart power stages (SPS/power stages) SPSA-1 (220-1) through SPSA-6 (220-6), SPSB-1 (230-1) through SPSB-3 (230-3), inductors 225A-1 through 225A-6 and 227B-1 through 227B-3, output capacitors 226A-1 through 226A-6 and 228B-1 through 228B-3, and bootstrap capacitors 224A-1 through 224A-6, 224B-1 through 224B-3. Each bootstrap capacitor associated with an SPS is shown connected between respective nodes SW and BOOT of the corresponding SPS. Thus, bootstrap capacitor 224A-1 is shown connected between switching node SWA-1 (221-1) and BOOTA-1 (215-1). Although bootstrap capacitor is shown connected external to each SPS, in alternative embodiments, bootstrap capacitor may be internal to the SPS. It is noted here that, in general, the term 'voltage regulator' refers to either a stand-alone regulator (such as a stand-alone switching converter) or a portion (such as a smart power stage) of a stand-alone regulator.

Power supply Va (240) (Rail-A) is generated by a 6-phase buck converter (there are six SPSs—220-1 through 220-6), while power supply Vb (250) (Rail-B) is generated by a 3-phase buck converter (there are three SPSs—230-1 through 230-3). Nodes/Paths 240 and 250 can correspond to paths 112A and 112B of FIG. 1. Also shown in FIG. 2 are the switching nodes 221-1 to 221-6 of the corresponding power stages. In the interest of conciseness, other power supply circuits that generate supplies on paths 113, 114 and 115 are not shown in FIG. 2. The smart power stages will individually or collectively be referred by reference number 220/230, as will be clear from the context. Also, inductors 225A-1 through 225A-3 and 227B-1 through 227B-4 may be collectively or individually referred to by respective numerals 225 and 227, as will also be clear from the context. Similar convention is followed for other blocks/components/signals throughout the disclosure.

In an embodiment of the present disclosure, each of the power stages as well as the phase controller is implemented as separate integrated circuits (ICs). However, in other embodiments, the implementations of the power stages and phase controller may be different.

Phase controller 210 in conjunction with one or more power stages of a rail operates to generate a regulated voltage as output. In the example of FIG. 2, phase controller 210 and one or more of the power stages of Rail-A, namely SPSA-1 through SPSA-6, operate to generate regulated voltage Va (240). Similarly, phase controller 210 and one or more of the power stages of Rail-B, namely SPSB-1 through SPSB-3, operate to generate regulated voltage Vb (250). Accordingly, Va (240) and Vb (250) are shown as being provided as inputs to phase controller 210 to enable operation of one or more feedback loops within phase controller 210 to regulate voltages Va and Vb. Phase controller 210 also receives inductor-current information (regarding current IL, 290, flowing through each of the inductors 225) from each of the SPSs to enable various operations such as current-mode control of voltage regulation, current limiting, short-circuit protection, and balancing the currents generated by each SPS of a same converter (or 'rail') so as to make the currents from each SPS of a converter to be substantially equal in magnitude. The other signals flowing between phase controller 210 and the SPSs are described below.

The combination of (corresponding circuitry within) phase controller 210, an SPS and the corresponding inductor and capacitor forms one "phase" of a rail. Thus, for example, SPSA-1, inductor 225A-1, capacitor 226A-1, and the corresponding portion within phase controller 210 form a single buck converter, and one phase of the 6-phase buck converter. It is noted here that, while each phase is shown as having its own separate capacitor (e.g., 226A-1), in another embodiment, only a single larger capacitor (larger capacitance) may be employed at node 240 (as well as 250). In other embodiments, multiple capacitors are placed close to the load powered by the corresponding supply voltage.

Phase controller 210 may be designed to implement automatic phase management (APM). Accordingly, the specific number of power stages (or phases) operated by phase controller 210 can vary depending, for example, on the magnitude of load-current drawn from a rail (e.g., Va 240). In general, the smaller the load-current is, fewer are the number of power stages used/operated and vice-versa.

Each SPS (or in general a 'power stage') may be implemented to contain a high-side switch, a low-side switch, gate drive circuitry for the two switches, a temperature monitor circuit and an inductor-current sense circuit/block to provide information indicating the magnitude of inductor-current (290) to phase controller 210. The current supplied by an SPS, and therefore the corresponding inductor-current generally depends on the load current drawn from the supply voltage, although the high-side switch and low-side switch of an SPS may be viewed as 'driving' the inductor. Each SPS receives a source of power (which can all be the same source) as an input which is connected to the high-side switch (shown in detail in sections below). In FIG. 2, the supply source is numbered 201, and has a voltage Vin. An example value of Vin in an embodiment of VRM 110 is about 21 volts (V). SPS 220 is also shown receiving voltage Vcc at power terminal 202.

Each SPS communicates with phase controller 210 via corresponding signals PWM, SYNC, CS and TEMP. Thus, SPSA-1 is shown connected to phase controller 210 through signal/paths PWMA-1 (211), SYNC-A (212), CSA-1 (213) and TEMPA (214). SPSA-6 communicates with phase controller 210 via signals PWMA-6, SYNC-A, CSA-6 and TEMP (214), although in FIG. 2, the respective connections of signals PWMA-6, SYNC-A and CSA-6 to phase controller 210 are not shown. Similarly, SPSB-1 is shown connected to phase controller 210 through signal/paths PWMB-1 (216), SYNC-B (217), CSB-1 (218) and TEMPB (219). SPSB-3 communicates with phase controller 210 via signals PWMB-3, SYNC-B, CSB-3 and TEMPB (219), although in FIG. 2, the respective connections of signals PWMB-3, SYNC-A and CSB-3 to phase controller 210 are not shown. The other SPSs would have similar connections with phase controller 210.

Signal PWM is an input to an SPS from phase controller 210, and may be viewed as a 'phase control signal' that controls the operation (ON and OFF states) of the power switches in the SPS of the corresponding phase. In an embodiment of the present disclosure, signal PWM is a pulse-width modulated (PWM) signal. Accordingly, in such an embodiment, signal PWM is a fixed-frequency, variable duty cycle signal. The duty cycle of the PWM signal is set by phase controller 210 and is designed to generate the desired power supply voltage and/or control/change the current supplied by that phase. For example, PWMA-1 (211) would have a duty cycle as required for the magnitude of Va (240) and the current to be provided by SPSA-1 (220-1). However, in general, signal PWM may have other characteristics depending on the specific implementation details of power supply 110.

For example, in another embodiment, phase controller 210 may employ a constant-ON-time control technique to generate Va. Accordingly, in such an embodiment, signal PWM is a variable frequency, fixed pulse-width (constant-ON-time) signal (i.e., pulse-frequency modulated signal, although the acronym PWM is still used herein to refer to such a signal for ease of reference). The frequency of the signal is generally proportional to the desired regulated voltage (Va) and the load current. In yet another embodiment, signal PWM can change between a constant-ON time variable-frequency signal and a fixed-frequency pulse-width modulated signal, based on load current requirements, desired efficiency of power supply 110 and other considerations, as would be apparent to one skilled in the relevant arts.

A PWM signal may be generated to have a logic HIGH state, a logic LOW state or a high-impedance (Hi-Z) state. Typically, the logic HIGH and logic LOW states of the PWM signal correspond respectively to the voltages (within error/noise margins) of the positive and negative rails of the power supply of the circuit generating the PWM signal, and the Hi-Z state corresponds to the mid-rail voltage of the power supply (or a voltage-window around the mid-rail voltage), as is well known in the relevant arts. However, other conventions can be employed for the three states of the PWM signal as would be apparent to one skilled in the relevant arts. Typically, the PWM signal needs to remain within the voltage-window noted above for a predetermined minimum duration for a power stage to correctly identify a Hi-Z state.

Signal PWM controls the opening and closing of the high-side switch and the low-side switch of a phase/power stage via the logic HIGH and logic LOW states. In an embodiment, a logic high level of PWMA-1 causes the high-side switch and the low-side switch in SPSA-1 to be respectively closed and open. A logic low level of PWMA-1 causes the high-side switch and the low-side switch in SPSA-1 to be respectively open and closed. Intervals in which HS switch is ON may be viewed as a ‘first phase’ (or ‘high-side phase’), and intervals in which LS switch is ON may be viewed as a ‘second phase’ (or ‘low-side phase’). The first and second phases repeat, and are thus periodic. The high-side switch and the low-side switch may be viewed as respectively ‘driving’ the inductor in each of the first phases and second phases periodically. It is noted that the terms ‘first phase’ and ‘second phase’ are not to be confused with the phases of a multi-phase converter (as noted above).

The Hi-Z state of the PWM signal indicates to the power stage that the power stage is not to operate in generating the output voltage, i.e., be ‘inactive’. Thus, when PWM is in the Hi-Z state, both the high-side and low-side switches of the stage are OFF, and the power stage can go to low-power/power-down modes. In general, phase controller 210 is designed to generate the PWM signal in a manner capable of indicating three states, with one of the three states indicating that the corresponding power stage is to be inactive. It will be apparent to one skilled in the relevant arts that such tri-state capability can be implemented in alternative ways. As an example, phase controller 210 can be implemented to generate PWM as a conventional binary signal with the power stages implemented to identify a Hi-Z state if the PWM signal is turned OFF, i.e., not generated at all.

As is well known in the relevant arts, the PWM signals to each SPS of a same converter may be staggered, i.e., delayed with respect to each other in phase such that typically no two high-side switches of a rail (i.e., in respective SPSs) are ON at the same time. Such a technique is employed for reasons such as, for example, to ensure that the peak instantaneous current drawn from Vin is relatively low at all times.

Signal TEMP is an output (e.g., a voltage) from an SPS to phase controller 210, and provides information regarding the temperature in the SPS. Phase controller 210 may process the TEMP signal (or the information contained in it) to adjust the current supplied by that phase, or for shut-down of the VRM in the event of a fault indicating over-temperature condition. The TEMP outputs of each phase of a converter are wired together, and a single input (for e.g., TEMPA 214) is connected to phase controller 210. The maximum of the TEMP outputs of a phase is driven on the wired connection.

Signal SYNC is an input to an SPS and may be used by phase controller 210 for the purposes of waking-up the SPS upon power-up of the power supply 110, and also to indicate the power-mode (e.g., PS2, PS3), i.e., output current requirement, of the multi-phase converter. Typically, all SPSs of the same converter share a single SYNC signal (e.g., SYNC-A 212). Signal SYNC is set to the Hi-Z state to signal that the SPSes are to be shut down, i.e., all SPSes are to become inactive, and the corresponding power supply is not generated. In an embodiment, the Hi-Z state is a voltage level/band between the logic HIGH and logic LOW voltage levels of the SYNC signal. A ‘SYNC=Hi-Z’ condition is treated as a “chip disable” signal by internal state machines (not shown) in a power stage, and the state machines shut down all the other internal blocks in the power stage.

Signal CS (current-sense) is an input to phase controller 210 from an SPS/phase, and contains information regarding the instantaneous magnitude of the inductor-current of that phase. The information can be in the form of a current, voltage, digital values, etc., depending on the specific implementation of the power stages and phase controller 210. A CS block in an SPS implements the current-sense operation and sends signal CS to phase controller 210.

In an embodiment of the present disclosure, the current-sense block of a power stage sends the sensed inductor-current information to phase controller 210 in the form of a current that can be of either the same magnitude as the inductor-current or (more typically) be a scaled-down version (in terms of magnitude) of the inductor-current. Correspondingly, in the embodiment, phase controller 210 is designed to receive the information in the form of a current, with the scaling factor being known to phase controller 210 as well as the (corresponding) power stage when scaling is used.

Typically, during operation of a power stage, as the PWM signal changes between logic HIGH and logic LOW, both switches change state, with one turning ON and the other turning OFF. Consequently, the magnitude of changes in inductor-current are large. This leads to a large rate of change of current (dI/dt) (of the order of tens/hundreds of Amperes per nano-second) flowing through the switches. Power stage devices, although packaged in very low resistance and low inductance packages, can still have parasitic inductance in the order of tens of pH (pico Henry). The combination of these two factors, L*dI/dt, can generate voltage bounce of a few Volts. The voltage bounce causes ground and supply nodes/package pins of the power stage to ring (i.e., voltage oscillates around the constant reference potential of ground and supply nodes) and couples a lot of unwanted noise and glitches into the various power stage circuits through these nodes. This may cause the power stage to wrongly indicate faults which have not actually occurred and/or fail to indicate faults that have actually occurred. More specifically, capture and storage of fault indications in digital circuits (e.g., flip-flop) which are clocked may become unreliable. Similar problems may manifest when the PWM signal transitions to/from hi-Z state. The description below refers only to problems when the PWM signal changes between logic HIGH and logic LOW in the interest of conciseness.

A power stage may use an internally generated clock (hereinafter “reference-clock”) for sampling and clocking logic/digital circuits inside the power stage. The reference-clock is uncorrelated to (i.e., not dependent on or related to)

the PWM transitions that cause the supply noise/ringing noted above. Thus, the edges of the reference clock coinciding (aligning) with the switching events may cause the power stage to generate fault indications unreliably.

Specifically, due to the ringing noted above, binary signals sampled by the reference-clock for storage by circuits/components inside the power stage may assume logic states that are not intended or expected by design. For example, when the sampling of the binary signals occurs coincident with PWM transitions, the local ground may not be zero Volts, and therefore the voltage level of the binary signals with respect to the local ground may lie in intermediate metastable range, causing a logic HIGH to be stored as a logic LOW and vice versa.

In addition, ringing may manifest as glitches on signals generated in the power stage. A glitch generally refers to an unintended transition of a signal to the wrong logic level. Typically, the duration of a glitch is short, or may be much smaller compared to a normal duration of the signal. The glitch in turn may be stored as a fault inside the power stage, if the sampling edges of the reference-clock occur at around the same time as the PWM transitions that resulted in the glitch.

When such fault signals are communicated to phase controller 210, phase controller 210 may take corrective action(s) in response to receipt of the fault signals. For example, for faults that warrant a shutdown of the power stage, phase controller 210 may send signals on corresponding path to shut down the power stage, which negatively impacts reliability of the power stage. Conversely, phase controller 210 may fail to take corrective action when actually needed.

It is thus desirable to enable capturing and/or storing of faults within the power stage in a reliable manner. Several aspects of the present disclosure are directed to minimizing or completely eliminating the false indication of faults noted above so as to communicate valid/actual faults to the phase controller, and are described in detail next.

4. Flow-Chart

Figure 3A:
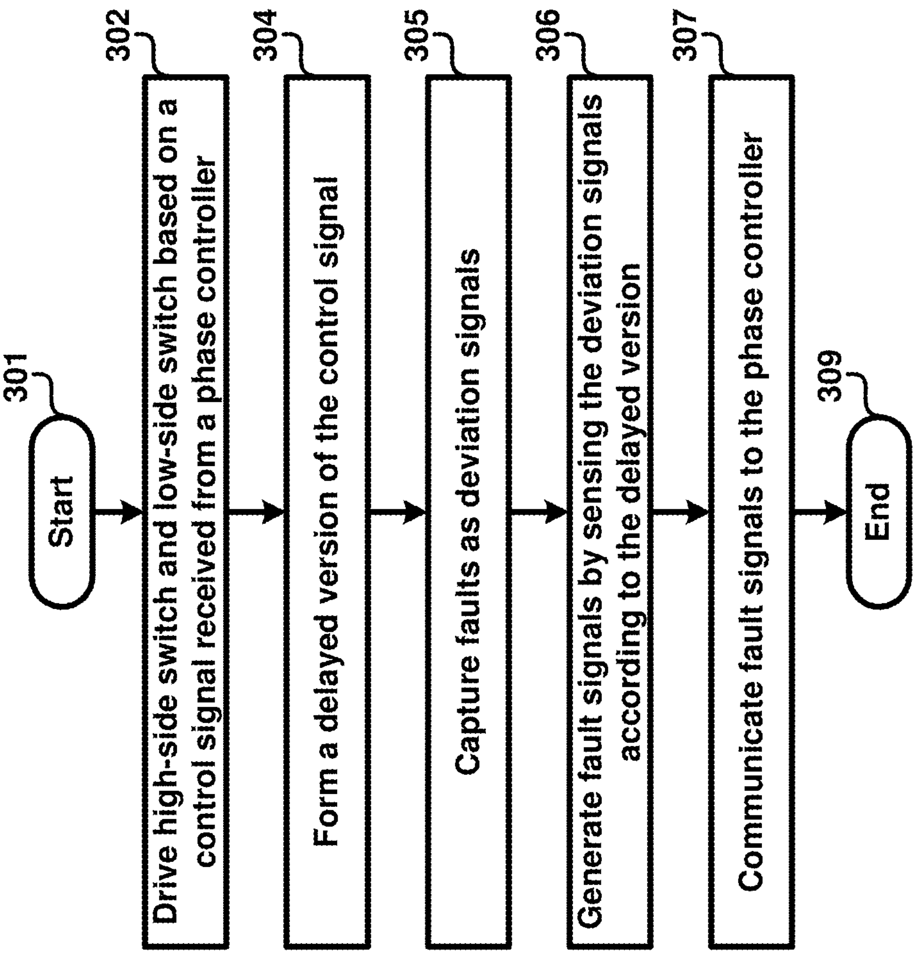
FIG. 3A is a flow-chart illustrating the manner in which a power stage communicates faults to a phase controller in an embodiment of the present disclosure.

FIG. 3A is a flow chart illustrating the manner in which faults communicated to the phase controller are generated with minimal or no inaccuracies in an embodiment of the present disclosure. While the description is provided with specific examples with reference to components of FIG. 2, the features of the present disclosure can be employed in the corresponding circuitry/sub-systems in other component and environment without departing from the scope and spirit of various aspects of the present disclosure, as will be apparent to one skilled in the relevant arts by reading the disclosure provided herein.

In addition, some of the steps may be performed in a different sequence than that depicted below, as suited to the specific environment, as will be apparent to one skilled in the relevant arts. Many of such implementations are contemplated to be covered by several aspects of the present disclosure. The flow chart begins in step 301, in which control immediately passes to step 302.

In step 302, SPS 220 drives a high-side switch and a low-side switch contained within the SPS based on PWM signal 211 received from phase controller 210. SPS 220 drives the high-side switch and the low-side switch by using respective first and second drive signals. As noted above, PWM signal 211 periodically transitions (toggles) between a first logic level (e.g., logic HIGH) and a second logic level (e.g., logic LOW). When PWM signal is not transitioning periodically between the logic levels (i.e., PWM signal is held at either logic HIGH or logic LOW or hi-Z), PWM signal is referred to as 'not toggling'. The first drive signal and the second drive signal are respectively asserted to drive respective currents through inductor 225 in a high-side phase and a low-side phase of SPS 220. Accordingly, the high-side switch is ON when PWM signal is in logic HIGH (high-side phase), and the low-side switch is ON when PWM signal is in logic LOW (low-side phase).

As noted above, when PWM signal switches between the two logic levels, ringing (unwanted oscillations/voltage bounces) occurs at the ground terminal (i.e., node 299), to settle by a settling time. Ringing may additionally occur at power terminals Vin (201) and Vcc (202) of SPS 220, to settle by settling time of a corresponding magnitude. The term 'settling time' as used herein refers to the duration from start of ringing to a time point where the amplitude of the oscillations becomes (and remains) less than an acceptable error range (e.g., 10% of peak-to-peak oscillations).

In step 304, SPS 220 forms a delayed version of PWM signal. The delayed version consists of edges formed by delaying corresponding edges of PWM signal by a magnitude greater than the maximum of settling times at various terminals noted above. In other words, assuming that the ringing at each of the ground terminal, power terminal Vin and power terminal Vcc individually settles in corresponding settling times, the maximum settling time is chosen for forming the delayed version of PWM signal. However, due to the nature of the ringing phenomenon (which is affected by lead inductances of IC packages, which may more or less be of similar magnitude at various lead terminals for a given IC package), the combination of ringing at various terminals may settle in a corresponding settling time. In general, the delay is selected such that all of such ringing at various terminals settles. Control then passes to step 305.

In step 305, SPS 220 captures faults (such as over-temperature, over-current, etc.) as corresponding deviation signals. The deviation signals are binary signals, which are sensed (sampled and/or latched) in SPS 220 by corresponding latching circuits (such as flip-flops, clocked by a clock internally generated in SPS 220). As noted above, the ringing may manifest as unintended device states and/or glitches on binary signals.

In step 306, SPS 220 generates fault signals by sensing each of the deviation signals according to the delayed version of PWM signal. It may be appreciated that ringing occurs when PWM signal transitions between the logic levels. By sensing deviation signals according to the delayed version of PWM signal, false indications of faults may be minimized or reduced significantly by allowing sufficient time for ringing to settle and ground potential to stabilize. Control passes to step 307.

In step 307, SPS 220 communicates the fault signals to phase controller 210. It may be appreciated that the fault signals generated in step 306 are reliably indicative of occurrence of fault conditions. Phase controller 210 may take any requisite corrective actions in response to receipt of the fault signals. For example, for faults that warrant a shut-down of SPS 220, phase controller 210 may send appropriate signals to SPS 220 in order to shut down the SPS. The flow-chart ends in step 309.

The description is continued to illustrate a power stage implemented according to the aspects of the present disclosure that senses faults reliably, taking into account the ringing effect noted above.

5. Smart Power Stage (SPS)

Figure 3B:
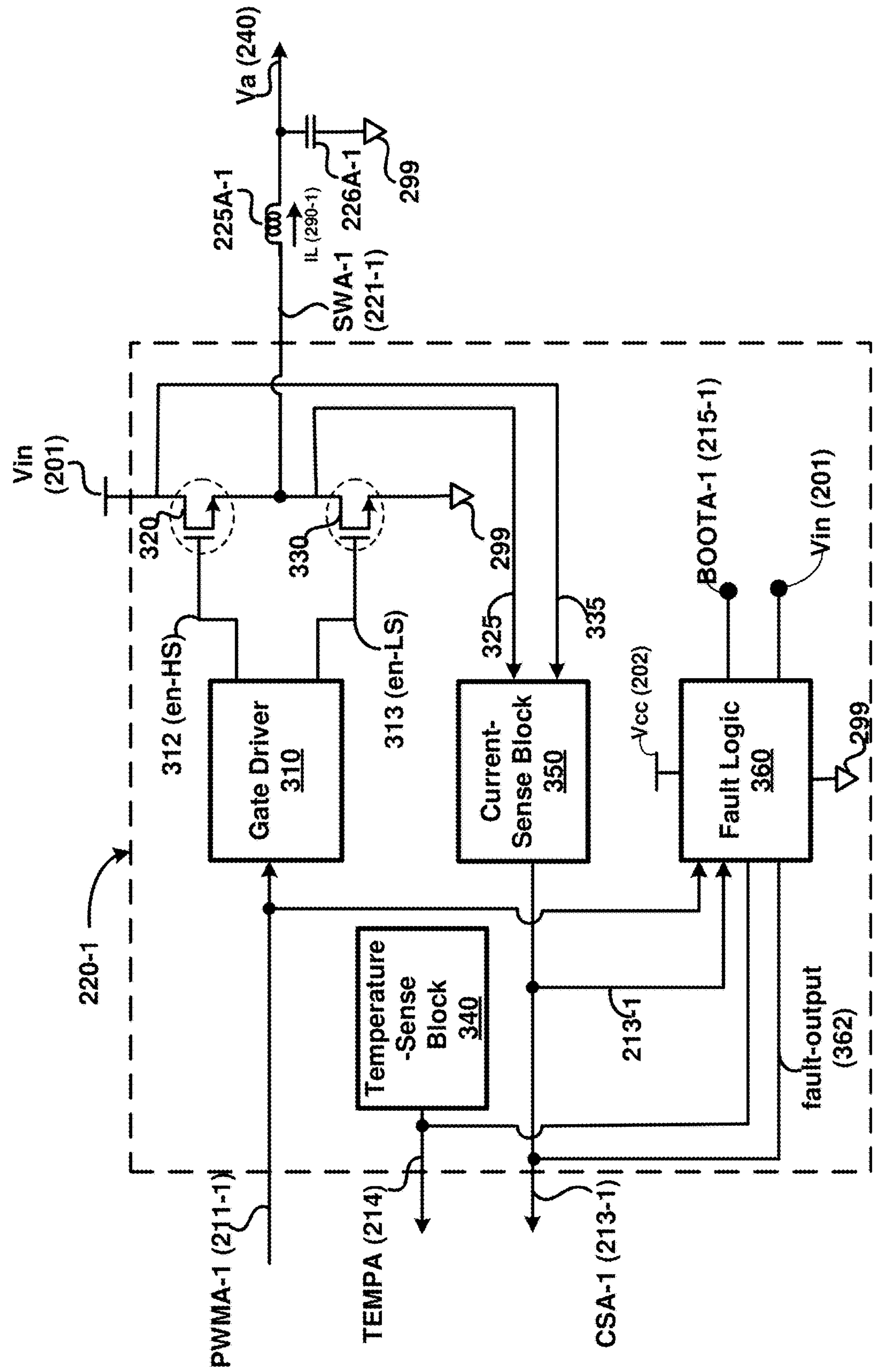
FIG. 3B is a block diagram illustrating the implementation details of a power stage in an embodiment of the present disclosure.

FIG. 3B is a block diagram illustrating the implementation details of an SPS in an embodiment of the present disclosure. SPSA-1 (220-1) is shown in detail in FIG. 3B. The other SPSes can also be implemented to be similar to SPSA-1. SPSA-1 is shown containing gate driver 310, high-side (HS) switch 320, low-side (LS) switch 330, temperature-sense block 340, current-sense block 350 and fault logic block 360. Also shown in FIG. 3B are inductor 225A-1, output capacitor 226A-1. Node 240 provides the supply voltage Va. It is noted herein that only components as relevant to the understanding of the disclosure are depicted in FIG. 3B. It is understood that SPS 220-1 can contain more or fewer blocks than those shown in FIG. 3B.

Gate driver 310 receives a PWM signal PWMA-1 (211-1) (from phase controller 210), and in response to the logic level of the PWM signal generates the appropriate voltages to turn ON and turn OFF HS switch 320 and LS switch 330 in corresponding intervals and as indicated by the logic levels of the PWM signal. HS switch 320 and LS switch 330 are each shown implemented as an N-channel MOSFET (Metal Oxide Semiconductor Field Effect Transistor) with gate driver 310 driving the gate terminals of the MOSFETs, although other implementations for the switches having similar characteristics can benefit from the features described herein.

In the example of FIG. 3B, when PWMA-1 is a logic HIGH, gate driver 310 generates respective appropriate voltages on paths 312 (en-HS) and 313 (en-LS) to switch-ON MOSFET 320 and switch-OFF MOSFET 330. When PWMA-1 is a logic LOW, gate driver 310 generates respective appropriate voltages on paths 312 and 313 to switch-OFF MOSFET 320 and switch-ON MOSFET 330. When PWMA-1 is in a Hi-Z (High-impedance or mid-rail) state, gate driver 310 generates the respective appropriate voltages on paths 312 and 313 to switch-OFF both of MOSFET 320 and 330. It is noted here that rather than a single block, two separate gate drivers may instead be employed—one for driving the gate of the HS switch to be ON or OFF, and another for driving the gate of the HS switch to be ON or OFF. Gate driver 310 can be implemented in a known way.

Temperature-sense block 340 operates to provide information (e.g., a voltage) on path 214 indicating a magnitude of measured junction temperature in SPS 220. Temperature-sense block 340 can be implemented in a known way.

Current-sense block 350 operates to determine the magnitude (for example, instantaneous magnitude) of the inductor-current through inductor 225A-1, and provides information indicating the inductor-current magnitude on path 213. Current-sense block 350 may determine the magnitude of the inductor-current by one of several known ways. For example, in FIG. 3B current-sense block 350 is shown as receiving inputs 325 and 335 respectively from HS switch 320 and LS switch 330. In an embodiment, signals 325 and 335 represent the respective voltage-drops across the HS and LS switches when the corresponding switch is ON and current is flowing through it and inductor 225A-1. Current-sense block 350 obtains the instantaneous magnitude of the inductor-current (or a scaled-down version thereof) based on the voltage-drops. In an embodiment, current-sense block 350 provides/reports the inductor-current information in the form of a (replica) current (sensed-current) having a magnitude that is scaled-down with respect to the instantaneous inductor-current magnitude. However, in alternative embodiments, current-sense block 350 can be implemented to provide the information in the form of a voltage or digital value(s). Current-sense block 350 can be implemented in a known way.

Fault logic block 360 operates to detect faults depending on a state internal to power stage 220, and communicates such faults to phase controller 210. Fault logic 360 is shown receiving PWMA-1 signal on path 211-1, temperature-sense information (TEMPA) on path 214, current-sense information (CSA-1) on path 213-1, voltages BOOTA-1 (215-1) and Vin (201), and generates signal fault-output on path 362. The lower and upper limits of boot and supply voltages, upper limits of inductor-current and temperature may be configured at design (hardwired in the IC) in a known way. Information received on paths 214, 213, 215 and 201 represents the internal state of SPS 220.

Fault logic block 360 internally generates signals indicating deviation(s) of parameters (such as temperature, inductor-current, etc. noted above) from the corresponding limits. Fault logic block 360 operates to sense (sample) such deviation signals according to the delayed version of signal PWMA-1 (211-1). In an embodiment, fault logic block 360 communicates signal fault-output to phase controller 210 via CSA path/pin 213.

The description is continued to illustrate the implementation details of a fault logic block in an embodiment of the present disclosure.

6. Fault Logic Block

Figure 4A:
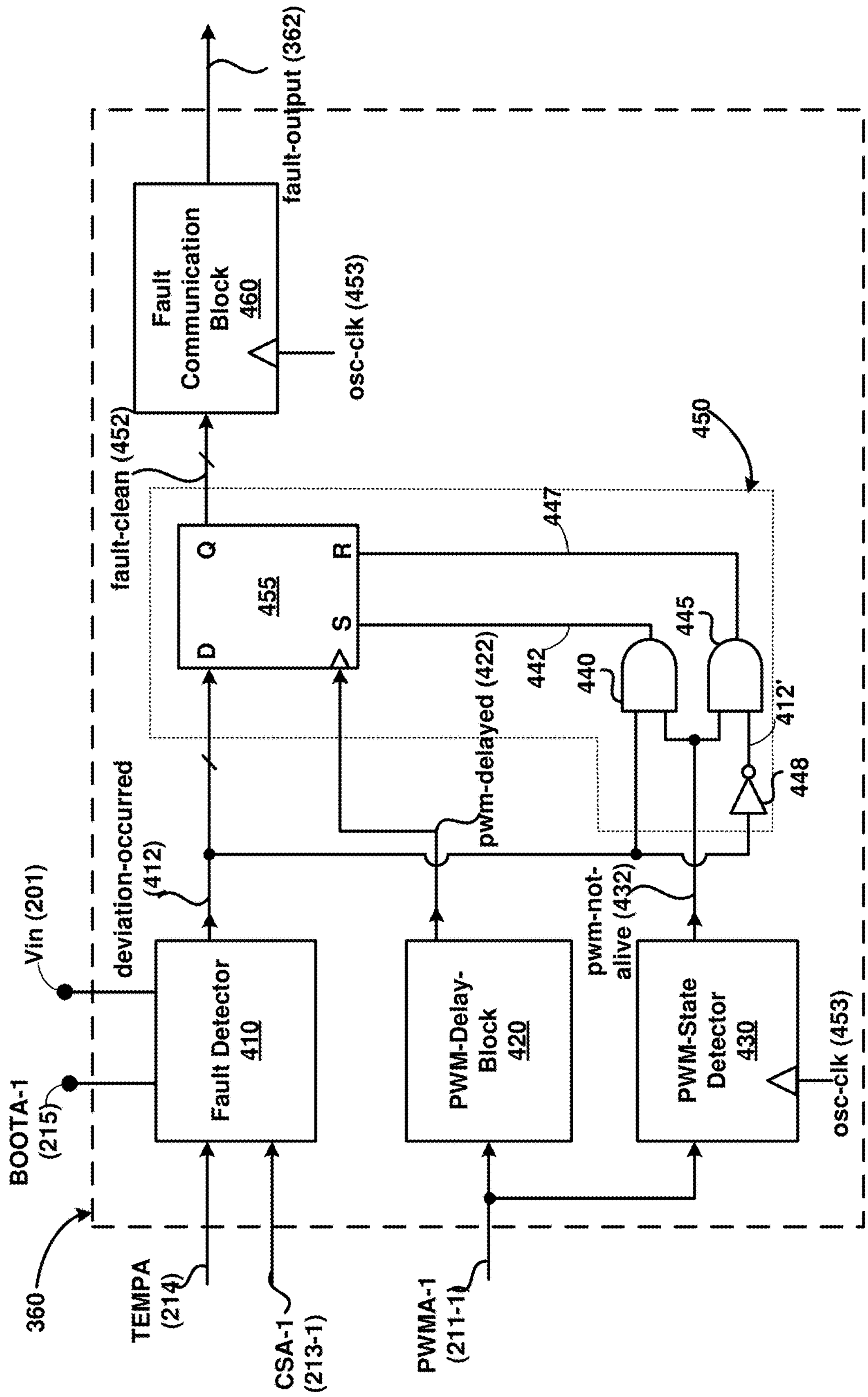
FIG. 4A is a diagram illustrating the details of a fault logic block in an embodiment of the present disclosure.

FIG. 4A is a diagram illustrating the implementation of a fault logic block in an embodiment of the present disclosure. Fault logic block 360 is shown containing fault detector 410, PWM-delay-block 420, PWM-state detector 430, fault-sampling block 450 and fault communication block 460. Fault-sampling block 450 in turn is shown containing inverter 448, flip-flop 455 and AND gates 440 and 445. Fault communication block 460 is shown clocked by reference-clock osc-clk (453). It is noted herein that only components as relevant to the understanding of the disclosure are depicted in FIG. 4A. It is understood that fault logic block can contain more or fewer blocks than those shown in FIG. 4A.

As noted above, when signal PWMA-1 transitions (toggles) between logic HIGH and logic LOW periodically, ringing may occur at ground terminal (299) that may result in false indication(s) of faults. Fault logic block implemented according to the aspects of the present disclosure operates to eliminate or significantly reduce such false indication of faults, thereby communicating valid faults to phase controller 210.

According to an aspect of the present disclosure, fault logic block 360 senses (samples) faults (deviation signals) according to a delayed version of PWMA-1 signal. By using sampling edges that are delayed with respect to edges of PWMA-1 signal for sampling deviation signals, it may be ensured that any erroneous logic states are not captured/stored during the ringing duration. Additionally, glitches on signals in the fault signal path caused by the ringing are also not stored/captured. In other words, the sensitivity of fault signals to ringing may be avoided. Such an approach may avoid or significantly reduce false indications of faults, thereby generating fault signals that are reliably indicative of fault conditions. The individual blocks of fault logic block 360 are described next in further detail.

Fault detector 410 generates signals deviation-occurred on path 412, indicating whether or not corresponding faults exist within SPS 220 by examining states internal to SPS 220. Fault detector 410 is shown receiving inputs temperature-sense information (TEMPA) on path 214, inductor-current information (CSA-1) on path 213-1 and voltages BOOTA-1 and Vin, that are representative of the internal state of SPS 220. The corresponding limits/ranges of boot and supply voltages, upper limits of inductor-current and temperature may be configured at design (hardwired in the IC) in a known way, or specified by user via corresponding means not shown.

In an embodiment, for each fault, fault detector 410 asserts (logic HIGH) corresponding signal deviation-occurred when a deviation from the specified limit is detected, and maintains the corresponding deviation-signal in the de-asserted state (logic LOW) otherwise. Fault detector 410 may internally contain over-current detector, comparator circuits, etc. in order to detect temperature, voltage and current exceeding corresponding limits. The specific circuits that detect such faults are not shown in FIG. 4A, but can be implemented in a known way. Although the illustrative embodiment depicts examination of inductor-current, temperature, boot voltage and Vin for deviations, alternative embodiments may examine fewer or additional parameters for corresponding deviations, as will be apparent to a skilled practitioner by reading the disclosure herein. Due to the ground bounce, glitches may appear on path/signal 412.

PWM-delay-block 420 operates to generate a delayed version of signal PWMA-1 on path 422. In an embodiment, the rising edges of signal 422 are delayed with respect to corresponding falling edges of PWMA-1 signal by a predetermined magnitude that is sufficient to allow propagation time from transitions in signal PWMA-1 to commencement of change in voltage magnitude at SW node (221-1), and the ringing to settle. Thus, the magnitude of delay equals a sum of (i) propagation time from occurrence of transitions of PWMA-1 signal to commencement of changes in magnitude of voltage at SW node, and (ii) the maximum settling time among settling times of ringing at ground (299), Vin (201), and Vcc (202) terminals, accounting for design margins specific to the environment. Circuits in the power stage may be simulated using suitable simulation tools (in a known way) and/or the power stage itself may be subjected to circuit testing, and the amount of time that it takes for the ringing to settle and the propagation time are measured based on the results. The delay magnitude may be configured at design (hardwired in the IC) in a known way. In the embodiment, delay magnitude is 50 nano-seconds (ns), for a power stage operating with input voltage of 12V and providing an output current in the range of tens of Amperes. In general, the magnitude of delay depends on factors such as package parasitic values (e.g., inductance, series resistance and capacitance), supported input voltages and output load currents, etc. In the embodiment, the falling edges of pwm-delayed are synchronous with the rising edges of PWMA. When PWMA-1 is not toggling, signal pwm-delayed is maintained at logic LOW. Although the illustrative embodiment depicts generation of rising edges of pwm-delayed being delayed with respect to falling edges of PWMA, aspects of the present disclosure are equally well applicable with falling edges of pwm-delayed being delayed, as will be apparent to a skilled practitioner by reading the disclosure herein. PWM-delay-block 420 can be implemented in a known way.

PWM-state detector 430 generates signal pwm-not-alive on path 432, and is clocked by reference-clock osc-clk (453). Signal pwm-not-alive indicates whether signal PWMA-1 (received as input on path 211-1) is toggling or not. In an embodiment, PWM-state detector 430 asserts (logic HIGH) signal pwm-not-alive when PWMA-1 is not toggling (i.e., PWMA-1 is held at logic HIGH or logic LOW or in hi-Z), and is maintained in a de-asserted (logic LOW) state otherwise. Thus, when signal PWMA-1 is toggling (transitioning between logic HIGH and logic LOW according to a frequency as determined by phase controller 210), signal pwm-not-alive is logic LOW. In an embodiment, PWM-state detector may be implemented as described with respect to FIG. 4B.

Fault-sampling block 450 senses (samples) each deviation-occurred signal according to the rising edges of pwm-delayed (422), and generates a respective signal fault-clean on path 452. Signal fault-clean represents a signal that is reliably indicative of a corresponding fault condition. Although only one instance of fault-sampling block 450 is shown in FIG. 4A for conciseness, it is noted herein that for each deviation-occurred signal, a corresponding fault-sampling block 450 is implemented to sense deviation-occurred signal and to generate the respective fault-clean signal.

Inverter 448 receives signal deviation-occurred on path 412 and generates logical inverse of the signal on path 412'. AND gate 440 receives signal pwm-not-alive on path 432 and signal deviation-occurred on path 412, and generates AND-output on path 442. AND gate 445 receives signal pwm-not-alive on path 432 and logical inverse of signal deviation-occurred on path 412', and generates AND-output on path 447.

Flip-flop 455 is clocked by signal pwm-delayed (422). Flip-flop 455 receives logic level of signal deviation-occurred at its D input and generates a corresponding output (Q) signal, fault-clean (452). In an embodiment, flip-flop 455 is implemented as positive edge triggered flip-flop. Accordingly, flip-flop 455 operates to store signal 412 synchronous with a rising edge of signal pwm-delayed (422). Additionally, flip-flop 455 operates as an SR-latch when receiving corresponding asynchronous set/reset inputs on S and R inputs (on paths 442 and 447 respectively) of flip-flop 455. In an alternative embodiment, flip-flop 455 may be implemented as negative edge triggered flip-flop when sampling edges are generated as falling edges by PWM-delay block 420, as will be apparent to a skilled practitioner by reading the disclosure herein.

In operation, when signal PWMA-1 is toggling, pwm-delayed is also transitioning between corresponding logic levels, i.e., containing rising edges timed after corresponding falling edges of PWMA-1 according to the specified delay. Thus, if a deviation-signal is asserted, flip-flop 455 transfers the logic level of deviation-occurred on path 452 synchronous with the rising edge of pwm-delayed occurring immediately after assertion of signal deviation-occurred. Additionally, when signal PWMA-1 is toggling, signal pwm-not-alive is a logic LOW. Accordingly, S and R inputs of flip-flop 455 are both at logic LOW.

When signal PWMA-1 is not toggling, signal pwm-delayed is at logic LOW. If a deviation-occurred signal is asserted, set-input is asynchronously asserted (by operation of AND gate 440), and the logic level (logic HIGH) of deviation-occurred is output on path 452. Thus, faults may be captured reliably in both cases—PWMA-1 toggling and PWMA-1 not toggling.

Fault communication block 460 receives signals fault-clean on path 452 and generates signal fault-output on path 362. Fault communication block 460 is shown clocked by osc-clk 453. In an embodiment, fault communication block 460 operates to serialize multiple fault-clean signals received on path 452, and generate fault-output on path 452. In an embodiment, fault communication block may be implemented as described with respect to FIG. 4C.

The description is continued to illustrate the implementation details of a PWM-state detector according to aspects of the present disclosure.

7. PWM-State Detector

Figure 4B:
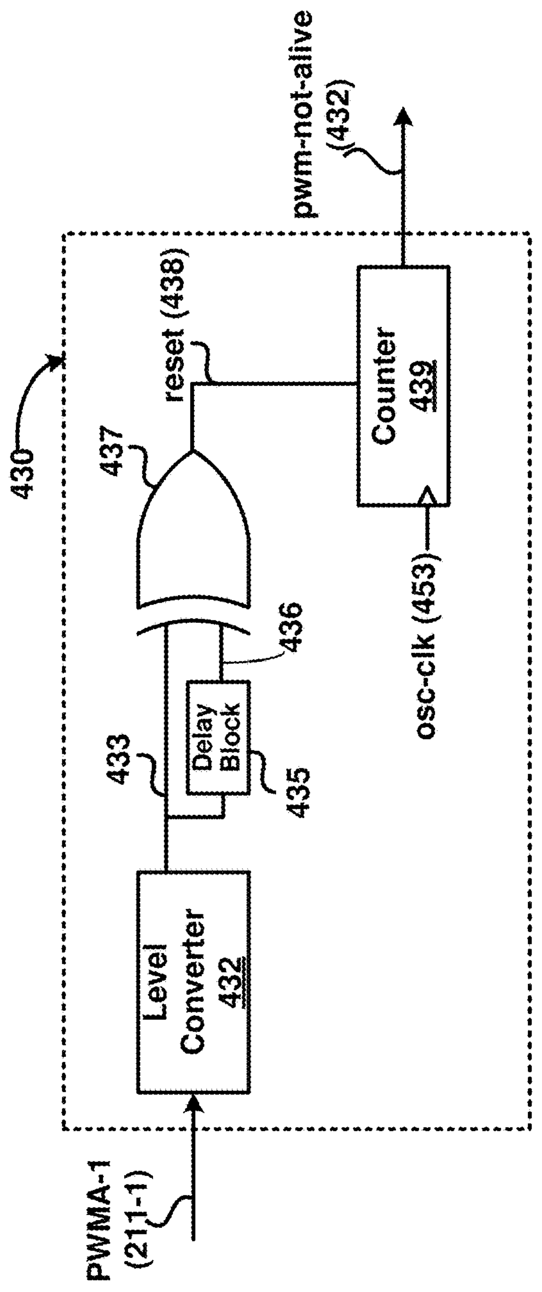
FIG. 4B is a diagram illustrating the details of a PWM-state detector in an embodiment of the present disclosure.

FIG. 4B is a diagram illustrating the implementation details of a PWM-state detector in an embodiment of the present disclosure. PWM-state detector 430 is shown containing level converter 432, delay block 435, XOR gate 437 and counter 439.

In the illustrative embodiment, PWM-state detector is shown employing a counter (counter 439) in order to detect whether signal PWMA-1 is toggling or not. The counter is reset whenever transitions occur in signal PWMA-1 (i.e., PWMA-1 is toggling). However, if PWMA-1 signal is not toggling (i.e., held at logic LOW/HIGH/hi-Z) for a duration longer than a predetermined duration corresponding to the maximum count of the counter, signal pwm-not-alive is asserted to indicate that PWMA-1 is not toggling.

Level converter 432 operates to generate a binary signal on path 433 from tri-state signal PWMA-1 received on path 211. In an embodiment, when logic level of PWMA-1 is a logic HIGH, signal 433 is a logic HIGH, and is a logic LOW otherwise. Level converter 432 can be implemented in a known way.

Delay block 435 generates signal 436 from input signal received on path 433. Signal 436 is a delayed version of signal 433. In an embodiment, the minimum pulse-width needed to reliably reset the counter noted above is the delay generated by delay block 435. The magnitude of delay may be fixed and may be configured at design time in SPS 220. In the illustrative embodiment, the delay magnitude equals 5 ns. XOR gate 437 receives signals 433 and 436, and generates signal 'reset' on path 438.

Counter 439 receives signal 'reset' on path 438, and is clocked by osc-clk (453). In an embodiment, counter 439 is implemented as a synchronous up-counter that counts to a maximum value corresponding to a duration of 8 microseconds. Counter 439 is reset (count value set to zero) when reset signal is logic HIGH. When count value reaches the maximum count, counter 439 asserts signal pwm-not-alive. Counter 439 may be designed to implement a duration that is sufficient to reliably determine that signal PWMA-1 is not toggling, depending on the specific implementation of SPS 220, as will be apparent to a skilled practitioner by reading the disclosure herein. Counter 439 can be implemented in a known way.

Although the illustrative embodiment depicts a particular technique (using reset signal and counter) in order to determine whether PWMA-1 is toggling or not, aspects of the present disclosure are equally applicable when alternative techniques (with corresponding signals) are employed to generate pwm-not-alive, as will be apparent to a skilled practitioner by reading the disclosure herein.

The description is continued to illustrate the implementation details of a fault communication block according to aspects of the present disclosure.

8. Fault Communication Block

Figure 4C:
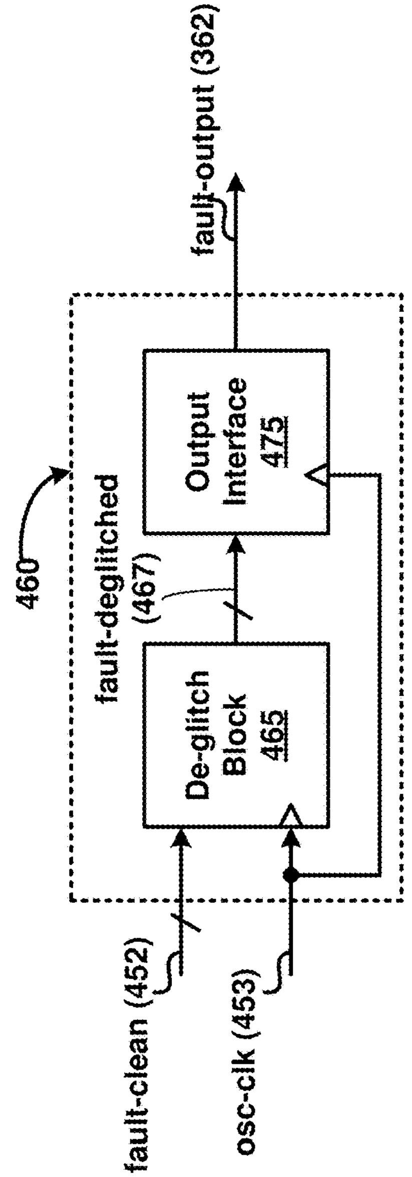
FIG. 4C is a diagram illustrating the details of a fault communication block in an embodiment of the present disclosure.

FIG. 4C is a diagram illustrating the implementation details of a fault communication block in an embodiment of the present disclosure. Fault communication block 460 is shown containing de-glitch block 480 and output interface 490. It is noted herein that only components as relevant to the understanding of the disclosure are depicted in FIG. 4C. It is understood fault communication block 460 can contain more or fewer blocks than those shown in FIG. 4C.

Fault communication block 460 operates to de-glitch fault information received on path 452 (which represents separate paths for each fault-clean signal), and records de-glitched fault signals in an internal memory, which can include volatile as well as non-volatile memory (storage). Fault communication block 460 transmits the recorded fault information on path 362 to phase controller 210 via output interface 475.

De-glitch block 465 operates to provide an additional level of reliability prior to communicating faults to phase controller 210, in addition to sampling delay implemented by fault-sampling block 450. De-glitch block 465 is shown receiving input on path 452 (containing multiple ones of fault-clean signals) and generates respective fault-deglitched signals on path 467. De-glitch block 465 is clocked by osc-clk (453).

In an embodiment, de-glitch block 465 is implemented to contain two flip-fops (FF) circuits for processing each fault-clean signal. The FF circuits operate to latch each fault-clean signal at corresponding edges of osc-clk spaced one or more cycles apart. The output of a first FF circuit is coupled as input to a second FF. The first FF samples a corresponding fault-clean signal. After one or more clock cycles (e.g., 2-3 clock cycles) of osc-clk, the output of the first FF will be latched in the second FF, and the first FF will sample the corresponding fault-clean signal again. If both sampled values are the same, then fault-deglitched is set to logic level of respective fault-clean signal. However, if the two sampled values are not the same, it is assumed that fault-clean signal is not reliable, and accordingly is ignored. Thus, the respective fault-deglitched corresponding to fault-clean signal is set to logic LOW (even though one sample value is a logic HIGH). De-glitch block 465 can be implemented in a known way. Although the illustrative embodiment depicts de-glitch block as part of fault communication block 460, in alternative embodiments, de-glitch block may be implemented to be outside (and prior to) fault communication block 460 in the path of signal fault-clean from fault-sampling block 450 to fault communication block 460.

Output interface 475 operates to store and transmit fault information to phase controller 210. In an embodiment, output interface 475 records de-glitched fault signals in an internal memory that is designed to be/contain a sticky-bit register designed to store only a first change in a bit, disabling any future changes to that bit. Some or all of the de-glitched fault signals may be recorded in a sticky bit register. In alternative embodiments, the internal memory may be implemented differently.

In an embodiment, output interface 475 transmits fault information (fault-output, 362) to phase controller 210 on path 213 (CSA-1). When output interface 475 is to transmit fault(s) on path 362, the output of current-sense block 350 is disconnected from path 213. Similarly, when current-sense block 350 is to transmit sensed inductor-current information on path 213, the output of output interface 475 is electrically disconnected from path 362 (e.g., internally by a switch). Such disconnection can be done in a known way, and the mechanism and command for such disconnection is not shown or described herein in the interest of conciseness. Although the illustrative embodiment depicts communication of faults on path 213 (CS path/pin), in alternative embodiments, different pins/paths (such as path 214) may be employed to suitably communicate fault-output to phase controller 210, with corresponding changes to circuitry, as will be apparent to a skilled practitioner by reading the disclosure herein.

It may be appreciated that only a single data path/line (CSA-1) is available for transmitting the fault information in the form of binary values serially, and no common clock is available as reference for a synchronous communication between SPS 220 and phase controller 210. In an embodiment, output interface 475 employs osc-clk as the transmit clock to send fault-output to phase controller 210. In the embodiment, output interface 475 transmits fault-output to phase controller 210 if any one of fault-deglitched signals is a logic HIGH. In an alternative embodiment, output interface 475 may transmit fault-output to phase controller (210) only when pre-configured fault condition(s) occur. In yet another alternative embodiment, output interface 475 may wait for a pre-determined time duration after receipt of logic HIGH on path 467 before transmitting the corresponding fault information to phase controller 210. In general, depending on the type of fault, the time and the manner in which it is transmitted to phase controller 210 may vary.

The description is continued to illustrate the manner in which faults are reliably captured to be communicated to phase controller 210 according to aspects of the present disclosure.

9. Reliably Detecting Faults

Figure 5A:
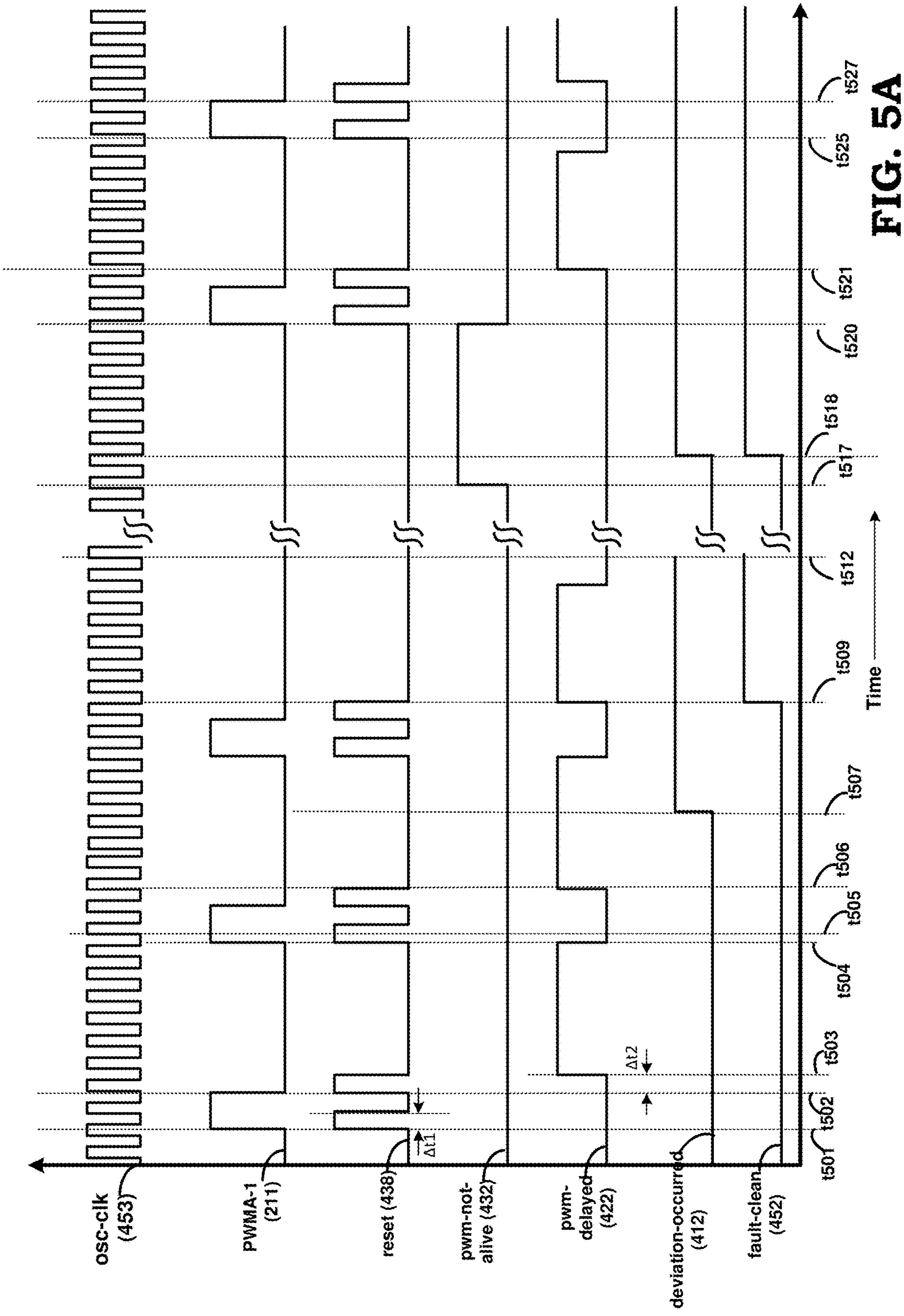
FIG. 5A is a timing diagram (not to scale) illustrating the waveforms of various signals inside the power stage in a first scenario, in an embodiment of the present disclosure.

FIG. 5A is a timing diagram (not to scale) illustrating example waveforms of signals at various nodes of SPS 220 in a first scenario in an embodiment of the present disclosure. The first scenario describes the situation where the ringing might have resulted in incorrect device state in the absence of fault-sampling block.

Example waveforms of osc-clk (453), PWMA-1 (211-1), reset (438), pwm-not-alive (432), pwm-delayed (422), deviation-occurred (412) and fault-clean (452) are depicted in FIG. 5A. Duration 'Δt1' represents the magnitude of delay generated by delay block 435, which also equals the pulse-width of signal 'reset' (438). Duration 'Δt2' represents the duration by which falling edges of PWM are delayed to generate corresponding rising edges of pwm-delayed signal.

PWMA-1 signal is shown toggling in time interval t501-*t*512. Time interval t501-*t*502 represents a high-side phase (HS switch 320 is ON and LS switch 330 is OFF) and time interval t502-*t*504 represents a low-side phase (HS switch 320 is OFF and LS switch 330 is ON). Pulses 'reset' (438) are accordingly generated with pulse-width equaling duration 'Δt1', synchronous with each of the rising and falling edges of PWM signal by operation of PWM-state detector 430. Counter 439 is therefore reset at t501, t502, t504 and so on. Signal pwm-not-alive remains at logic LOW in time interval t501-*t*512.

Each falling edge of PWMA-1 signal is delayed by 'Δt2' duration to generate a corresponding rising edge (e.g., at t503, t506, t509) is pwm-delayed signal. Falling edges (e.g., at t504) of pwm-delayed are shown generated synchronous with rising edges of PWMA-1 in the illustrative embodiment.

It is assumed that no faults have occurred in time interval t501-*t*507. Accordingly, deviation-occurred is shown to be at logic LOW in time interval t501-*t*507. It is noted herein that in the absence of fault-sampling block 450, there is a non-zero probability that logic LOW (of deviation-occurred) in time interval t504-*t*505 may be interpreted as logic HIGH due to the ringing, and would have been stored in fault communication block at the rising edge of osc-clk occurring at t505. The rising edge of osc-clk at t505 occurs very close to the low-to-high transition of PWMA-1 signal occurring at t504 that leads to the ringing. Such a misinterpretation would have been communicated as a corresponding fault to phase controller 210. However, due to fault-sampling block 450 not sampling deviation-occurred until after the ringing settles, there may be no false indication of fault to phase controller 210.

At t507, a fault is assumed to have occurred, and accordingly the corresponding signal deviation-occurred is asserted (and remains asserted) to indicate the occurrence of the fault. The asserted state of deviation-occurred is output on Q-output of flip-flop 455 at t509, at the occurrence of rising edge of pwm-delayed occurring immediately after assertion of deviation-occurred. Accordingly, fault-clean is shown asserted from time instant t509.

Prior to t517, PWMA-1 signal stops toggling, and does not toggle till t520. In the illustrative embodiment, PWMA-1 signal is shown to be held at logic LOW when it is not toggling, although PWMA-1 signal could be held at logic HIGH or hi-Z. Since PWMA-1 signal is not toggling, by operation of PWM-state detector 430, 'reset' is maintained at logic LOW. At t517, when counter reaches the maximum count, pwm-not-alive is asserted, and remains asserted until PWMA-1 starts toggling again (at t520). Signal pwm-delayed is held at logic LOW in time interval t517-*t*521.

At t518, it is assumed that a fault has occurred, and accordingly the corresponding deviation-occurred signal is asserted (and remains asserted). Flip-flop 455 operates as an SR-latch, and fault-clean is asserted at t518 due to set-input of flip-flop 455 going HIGH at t518.

The description is continued to illustrate the manner in which glitches in deviation-occurred signals are prevented (or at least reduced from) being indicated as corresponding faults.

Figure 5B:
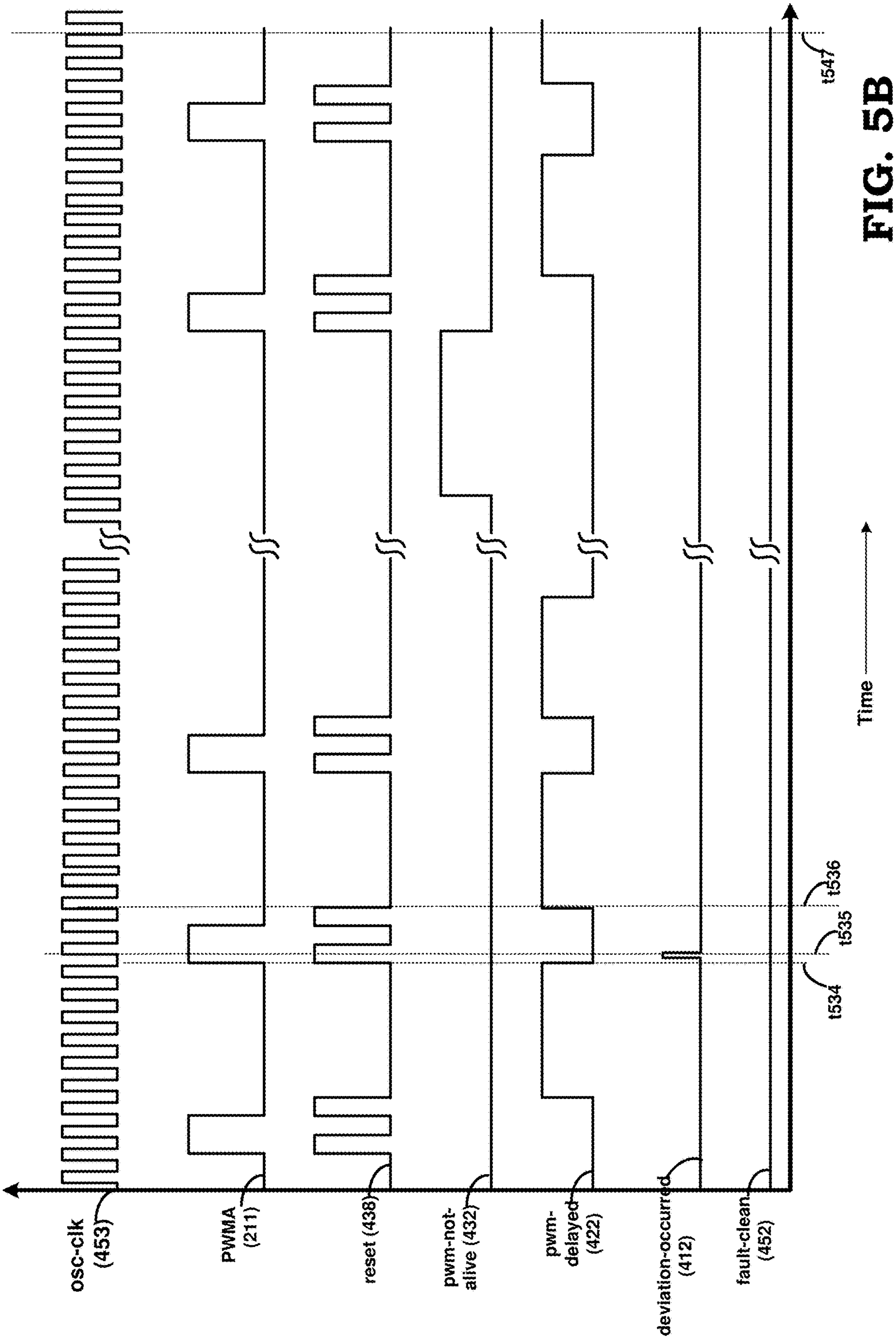
FIG. 5B is a timing diagram (not to scale) illustrating the waveforms of various signals inside the power stage in a second scenario, in an embodiment of the present disclosure.

FIG. 5B is a timing diagram (not to scale) illustrating example waveforms of signals at various nodes of SPS 220 in a second scenario in an embodiment of the present disclosure. The second scenario describes the situation where the ringing might result in glitches on signal deviation-occurred that may have been indicated as faults in the absence of fault-sampling block. The waveforms of FIG. 5B correspond to those of FIG. 5A. Only the differences from the waveforms of FIG. 5A are described here with respect to FIG. 5B in the interest of brevity.

In time interval t534-*t*535, a glitch on signal deviation-occurred is shown as occurring. The glitch is assumed to have occurred due to ringing caused by switching event in response to low-to-high transition of PWMA-1 signal occurring at t534. In the absence of fault-sampling block 450, the glitch would have been stored as a valid fault at the rising edge of osc-clk occurring at t535. Such an invalid fault would have been communicated as a corresponding fault to phase controller 210.

At t536, deviation-occurred signal is a logic LOW. Due to sensing (sampling) of deviation-occurred at the rising edge of pwm-delayed signal (occurring at t536), by which time the ringing has settled, the glitch on signal deviation-occurred is not captured as a fault (signal fault-clean continues to be logic LOW at t536). No deviations are assumed to have occurred in time interval t536-*t*547. Accordingly, signals deviation-occurred and fault-clean are shown to be at logic LOW in time interval t536-*t*547.

In this manner, faults are captured reliably and communicated by a power stage of a multi-phase switching converter according to aspects of the present disclosure.

10. Conclusion

References throughout this specification to "one embodiment", "an embodiment", or similar language means that a particular feature, structure, or characteristic described in connection with the embodiment is included in at least one embodiment of the present disclosure. Thus, appearances of the phrases "in one embodiment", "in an embodiment" and similar language throughout this specification may, but do not necessarily, all refer to the same embodiment.

While in the illustrations of FIGS. 1, 2, 3B and 4A-4C, although terminals/nodes are shown with direct connections to (i.e., "connected to") various other terminals, it should be appreciated that additional components (as suited for the specific environment) may also be present in the path, and accordingly the connections may be viewed as being "electrically coupled" to the same connected terminals.

In the instant application, the power and ground terminals are referred to as constant reference potentials.

While various embodiments of the present disclosure have been described above, it should be understood that they have been presented by way of example only, and not limitation. Thus, the breadth and scope of the present disclosure should not be limited by any of the above-described embodiments, but should be defined only in accordance with the following claims and their equivalents.

What is claimed is:

1. A power stage of a multi-phase switching converter comprising:

a high-side switch and a low-side switch connected in series at a switching node, said high-side switch and said low-side switch being connected in series between a first power terminal provided with a first power source and a ground terminal providing a constant reference potential, wherein an inductor is coupled between said switching node and an output node at which said power stage provides a regulated voltage, wherein said high-side switch and said low-side switch are respectively operated by a first drive signal and a second drive signal, said first drive signal and said second drive signal to be respectively asserted to drive respective currents through said inductor in a high-side phase and a low-side phase;

a gate driver to generate said first drive signal and said second drive signal based on a control signal received from a phase controller, wherein said first drive signal and said second drive signal are respectively asserted when said control signal is at a first logic level and a second logic level, wherein ringing occurs at said ground terminal when said control signal switches between said first logic level and said second logic level to settle by a settling time; and a fault logic block for generating a plurality of deviation signals indicating corresponding deviations by examining states internal to said power stage, wherein each deviation signal of said plurality of deviation signals is a binary logic signal indicating whether or not a corresponding fault exists, said fault logic block generating a plurality of fault signals by sensing said plurality of deviation signals according to a delayed version of said control signal, wherein said delayed version is generated by delaying said control signal by a first delay having a magnitude greater than said settling time, said fault logic block communicating said fault signals to said phase controller for any requisite corrective actions.

2. The power stage of claim 1, wherein said fault logic block is powered by a second power source supplying power at a second power terminal, wherein ringing additionally occurs at said first power terminal and said second power terminal to settle by said settling time of a corresponding magnitude.

3. The power stage of claim 1, wherein said control signal toggles between said first logic level and said second logic level periodically in a first duration, wherein said control signal does not toggle in a second duration, wherein said fault logic block comprises:

a plurality of fault-sampling blocks with each fault-sampling block of said plurality of fault-sampling blocks coupled to receive a corresponding deviation signal of said plurality of deviation signals and to generate a respective fault signal of said plurality of fault signals, wherein each fault-sampling block of said plurality of fault-sampling blocks comprises:

a flip-flip coupled to receive said corresponding deviation signal on a data input and said delayed version on a clock input in said first duration, wherein said flip-flop is coupled to receive said corresponding deviation signal on a set input in said second duration, wherein a Q-output of said flip-flop is said respective fault signal of said plurality of fault signals.

4. The power stage of claim 3, wherein said fault logic block comprises:

a first delay-block coupled to receive said control signal and to generate said delayed version, wherein said first delay-block generates rising edges of said delayed version by delaying corresponding falling edges of said control signal by said magnitude of said first delay, wherein said magnitude of said first delay is a sum of (i) duration from transition of said control signal between said second logic level and said first logic level to commencement of change of voltage at said switching node in response to said transition, and (ii) said settling time.

5. The power stage of claim 3, wherein said fault logic block comprises:

a fault detector block coupled to receive a temperature information indicating temperature of said power stage, a current information indicating a scaled magnitude of instantaneous current through said inductor, a voltage information indicating magnitude of voltage at said first power terminal, and to generate said plurality of deviation signals, wherein a corresponding deviation signal of said plurality of deviation signals is asserted when a fault condition is determined to exist based on said temperature information, current information and voltage information;

a control-signal-state detector block to receive said control signal and to generate a pwm_toggling signal with said first logic level in said first duration, and with said second logic level in said second duration; and a fault communication block coupled to receive said plurality of fault signals and to generate a fault-output, wherein said fault communication block communicates said fault-output signal to said phase controller, wherein each fault-sampling block of said plurality of fault-sampling blocks comprises:

a first inverter coupled to receive said corresponding deviation signal and to generate a logical inverse of said corresponding deviation signal;

a first AND-gate to receive said deviation signal and said pwm_toggling signal, and to generate a first AND-output; and a second AND-gate to receive said logical inverse and said pwm_toggling signal, and to generate a second AND-output, wherein said flip-flop receives said first AND-output at said set input and said second AND-output at a reset input.

6. The power stage of claim 5, wherein said control-signal-state detector block comprises:

a level converter to receive said control signal and to generate a converter-output as a binary signal, wherein said converter-output is generated as a logic HIGH when said control signal is in said first logic level, and as logic LOW otherwise;

a second delay-block coupled to receive said converter-output and to delay said converter-output by a second delay magnitude to generate a second delayed-signal;

an XOR gate coupled to receive said converter-output and said second delayed-signal, and to generate a reset signal, wherein, in said first duration, said reset signal is generated with a pulse-width equaling said second delay magnitude synchronous with transitions of said control signal, wherein, in said second duration, said reset signal is at logic LOW; and a counter operable to count up from zero value to a maximum count, wherein said counter is clocked by a reference-clock, wherein a count of said counter is set to zero value when said reset signal is at logic HIGH, wherein said counter asserts said pwm-toggling signal when a count of said counter reaches said maximum count.

7. The power stage of claim 6, wherein said fault communication block comprises:

a de-glitch block coupled to receive said plurality of fault signals and to generate a plurality of fault-deglitched signals corresponding to said plurality of fault signals, said de-glitch block being clocked by said reference-clock, wherein said de-glitch block is operable to latch each fault signal of said plurality of fault signals at a first time instance to generate a first-latched value and at a second time instance following said first time instance to generate a second-latched value, check whether said first-latched value and said second-latched value are the same, if it is determined that said first-latched value and said second-latched value are the same, generating a fault-deglitched signal corresponding to said each fault signal with a logic level that is same as that of said each fault signal, if it is determined that said first-latched value and said second-latched value are not the same, generating a fault-deglitched signal corresponding to said each fault signal with a logic LOW; and an output interface block coupled to receive and store in a register said plurality of fault-deglitched signals, and to generate said fault-output by serializing said plurality of fault-deglitched signals according to said reference-clock.

8. The power stage of claim 7, wherein said plurality of fault signals indicate occurrence of corresponding faults including:

a magnitude of current through said inductor exceeding a corresponding limit;

a magnitude of temperature of said power stage exceeding corresponding limit; and a short across said first power terminal and said ground terminal.

9. A voltage regulator module (VRM) comprising:

a phase controller to provide a regulated supply voltage on a supply node based on an input voltage received at an input node; and a power stage comprising:

a high-side switch and a low-side switch coupled in series at a switching (SW) node, said high-side switch and said low-side switch being connected in series between said input node and a ground terminal providing a constant reference potential, wherein an inductor is coupled between said switching node and said supply node, wherein said high-side switch and said low-side switch are respectively operated by a first drive signal and a second drive signal, said first drive signal and said second drive signal to be respectively asserted to drive respective currents through said inductor in a high-side phase and a low-side phase;

a gate driver to generate said first drive signal and said second drive signal based on a control signal received from said phase controller, wherein said first drive signal and said second drive signal are respectively asserted when said control signal is at a first logic level and a second logic level, wherein ringing occurs at said ground terminal when said control signal switches between said first logic level and said second logic level to settle by a settling time; and a fault logic block for generating a plurality of deviation signals indicating corresponding deviations by examining states internal to said power stage, wherein each deviation signal of said plurality of deviation signals is a binary logic signal indicating whether or not a corresponding fault exists, said fault logic block generating a plurality of fault signals by sensing said plurality of deviation signals according to a delayed version of said control signal, wherein said delayed version is generated by delaying said control signal by a first delay having a magnitude greater than said settling time, said fault logic block communicating said fault signals to said phase controller for any requisite corrective actions.

10. The VRM of claim 9, wherein said fault logic block is powered by a second voltage received at a power terminal, wherein ringing additionally occurs at said input node and said power terminal to settle by said settling time of a corresponding magnitude.

11. The VRM of claim 9, wherein said control signal toggles between said first logic level and said second logic level periodically in a first duration, wherein said control signal does not toggle in a second duration, wherein said fault logic block comprises:

a plurality of fault-sampling blocks with each fault-sampling block of said plurality of fault-sampling blocks coupled to receive a corresponding deviation signal of said plurality of deviation signals and to generate a respective fault signal of said plurality of fault signals, wherein each fault-sampling block of said plurality of fault-sampling blocks comprises:

a flip-flip coupled to receive said corresponding deviation signal on a data input and said delayed version on a clock input in said first duration, wherein said flip-flop is coupled to receive said corresponding deviation signal on a set input in said second duration, wherein a Q-output of said flip-flop is said respective fault signal of said plurality of fault signals.

12. The VRM of claim 11, wherein said fault logic block comprises:

a first delay-block coupled to receive said control signal and to generate said delayed version, wherein said first delay-block generates rising edges of said delayed version by delaying corresponding falling edges of said control signal by said magnitude of said first delay, wherein said magnitude of said first delay is a sum of (i) duration from transition of said control signal between said second logic level and said first logic level to commencement of change of voltage at said switching node in response to said transition, and (ii) said settling time.

13. The VRM of claim 11, wherein said fault logic block comprises:

a fault detector block coupled to receive a temperature information indicating temperature of said power stage, a current information indicating a scaled magnitude of instantaneous current through said inductor, a voltage information indicating magnitude of voltage at said input node, and to generate said plurality of deviation signals, wherein a corresponding deviation signal of said plurality of deviation signals is asserted when a fault condition is determined to exist based on said temperature information, current information and voltage information;

a control-signal-state detector block to receive said control signal and to generate a pwm_toggling signal with said first logic level in said first duration, and with said second logic level in said second duration; and a fault communication block coupled to receive said plurality of fault signals and to generate a fault-output, wherein said fault communication block communicates said fault-output signal to said phase controller, wherein each fault-sampling block of said plurality of fault-sampling blocks comprises:

a first inverter coupled to receive said corresponding deviation signal and to generate a logical inverse of said corresponding deviation signal;

a first AND-gate to receive said deviation signal and said pwm_toggling signal, and to generate a first AND-output; and a second AND-gate to receive said logical inverse and said pwm_toggling signal, and to generate a second AND-output, wherein said flip-flop receives said first AND-output at said set input and said second AND-output at a reset input.

14. The VRM of claim 13, wherein said control-signal-state detector block comprises:

a level converter to receive said control signal and to generate a converter-output as a binary signal, wherein said converter-output is generated as a logic HIGH when said control signal is in said first logic level, and as logic LOW otherwise;

a second delay-block coupled to receive said converter-output and to delay said converter-output by a second delay magnitude to generate a second delayed-signal;

an XOR gate coupled to receive said converter-output and said second delayed-signal, and to generate a reset signal, wherein, in said first duration, said reset signal is generated with a pulse-width equaling said second delay magnitude synchronous with transitions of said control signal, wherein, in said second duration, said reset signal is at logic LOW; and a counter operable to count up from zero value to a maximum count, wherein said counter is clocked by a reference-clock, wherein a count of said counter is set to zero value when said reset signal is at logic HIGH, wherein said counter asserts said pwm-toggling signal when a count of said counter reaches said maximum count.

15. The VRM of claim 14, wherein said fault communication block comprises:

a de-glitch block coupled to receive said plurality of fault signals and to generate a plurality of fault-deglitched signals corresponding to said plurality of fault signals, said de-glitch block being clocked by said reference-clock, wherein said de-glitch block is operable to latch each fault signal of said plurality of fault signals at a first time instance to generate a first-latched value and at a second time instance following said first time instance to generate a second-latched value, check whether said first-latched value and said second-latched value are the same, if it is determined that said first-latched value and said second-latched value are the same, generating a fault-deglitched signal corresponding to said each fault signal with a logic level that is same as that of said each fault signal, if it is determined that said first-latched value and said second-latched value are not the same, generating a fault-deglitched signal corresponding to said each fault signal with a logic LOW; and an output interface block coupled to receive and store in a register said plurality of fault-deglitched signals, and to generate said fault-output by serializing said plurality of fault-deglitched signals according to said reference-clock.

16. The VRM of claim 15, wherein said plurality of fault signals indicate occurrence of corresponding faults including:

a magnitude of current through said inductor exceeding a corresponding limit;

a magnitude of temperature of said power stage exceeding corresponding limit; and a short across said input node and said ground terminal.

17. A method performed in a power stage of a multi-phase switching converter, said multi-phase switching converter providing a regulated supply voltage on a supply node based on an input voltage received at an input node, said method comprising:

driving a high-side switch and a low-side switch of said power stage based on a control signal received from a phase controller, said high-side switch and said low-side switch being connected in series at a switching node, said high-side switch and said low-side switch being connected in series between said input node and a ground terminal providing a constant reference potential, wherein an inductor is coupled between said switching node and said supply node, wherein ringing occurs at said ground terminal when said control signal switches between a first logic level and a second logic level to settle by a settling time; and forming a delayed version of said control signal, wherein said delayed version is formed by delaying said control signal by a first delay having a magnitude greater than said settling time;

capturing a plurality of faults as corresponding plurality of deviation signals;

generating respective plurality of fault signals by sensing said plurality of deviation signals according to said delayed version; and communicating said plurality of fault signals to said phase controller for any requisite corrective actions.

18. The method of claim 17, wherein ringing additionally occurs at said input node to settle by said settling time of a corresponding magnitude.

19. The method of claim 17, wherein said magnitude of said first delay is a sum of (i) duration from transition of said control signal between said second logic level and said first logic level to commencement of change of voltage at said switching node in response to said transition, and (ii) said settling time.

20. The method of claim 19, wherein said control signal toggles between said first logic level and said second logic level periodically in a first duration, wherein said control signal does not toggle in a second duration, wherein, in said first duration, said sensing comprises storing in a storage element, said plurality of fault signals synchronous with a corresponding sampling edge of said delayed version, wherein, in said second duration, said sensing comprises asynchronously storing in said storage element said plurality of fault signals, wherein said method further comprises:

de-glitching said plurality of fault signals to generate corresponding plurality of fault-deglitched signals, wherein said de-glitching comprises:

latching each fault signal of said plurality of fault signals at a first time instance to generate a first-latched value and at a second time instance following said first time instance to generate a second-latched value;

checking whether said first-latched value and said second-latched value are the same;

if it is determined that said first-latched value and said second-latched value are the same, generating a fault-deglitched signal corresponding to said each fault signal with a logic level that is same as that of said each fault signal, if it is determined that said first-latched value and said second-latched value are not the same, generating a fault-deglitched signal corresponding to said each fault signal with a logic LOW; and serializing said plurality of fault-deglitched signals for said communicating.

* * * * *